United States Patent Office 2,822,594
Patented Feb. 11, 1958

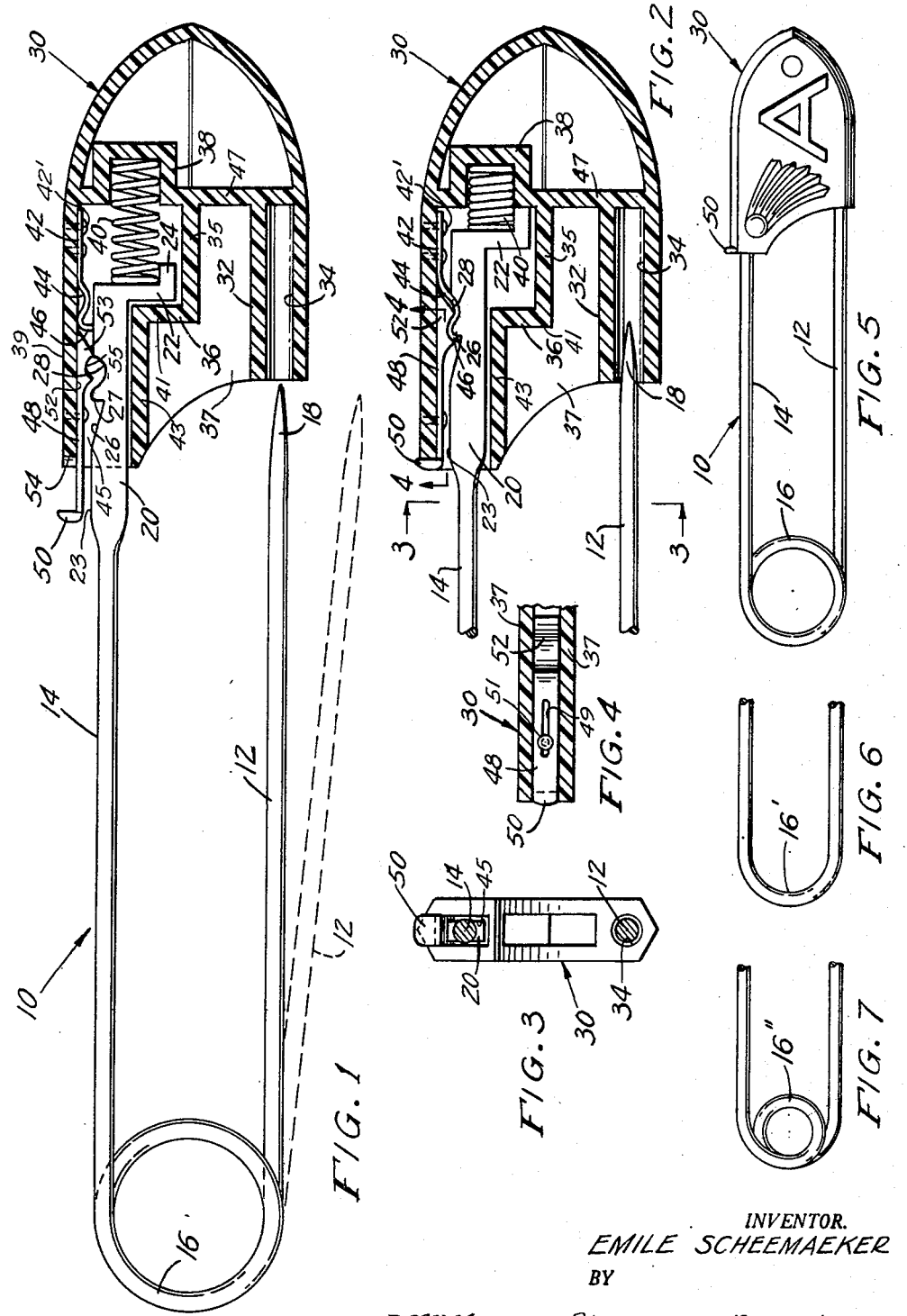

2,822,594

SAFETY PIN

Emile Scheemaeker, Howard, R. I.

Application September 9, 1955, Serial No. 533,388

1 Claim. (Cl. 24—158)

This invention relates to an improved safety pin of the type having a guard mounted on one leg of its pin member arranged to be engaged on and disengaged from the point of the other leg of the pin member.

The primary object of the invention is to provide a generally superior safety pin of this kind which involves an improved guard and improved means for releasably but positively locking the guard against movement along the related leg of the pin member to a pin point releasing position.

Other important objects and advantageous features of the invention will be apparent from the following description and the accompanying drawings, wherein, for purposes of illustration only, a specific form of the invention is set forth in detail.

In the drawings:

Figure 1 is a side view of a safety pin embodying the features of this invention, the guard being illustrated in section and in released position;

Figure 2 is a fragmentary view similar to Figure 1, showing the guard locked in guarding position;

Figure 3 is a sectional view taken substantially on the line 3—3 of Figure 2;

Figure 4 is a fragmentary sectional view taken substantially on the line 4—4 of Figure 2;

Figure 5 is a side view of the safety pin on a reduced scale;

Figure 6 is a fragmentary side view of a modified pin member; and

Figure 7 is a fragmentary side view of another modified pin member.

Referring to the drawings in detail, the illustrated safety pin comprises a pin member 10 having laterally spaced first and second legs 12 and 14, respectively, which are resiliently connected at one end by a spring loop 16. The first leg 12 terminates at its forward end in a point 18. The same end of the second leg 14 terminates in a rectangular cross section extension 20. The extension 20 terminates in a right angular lateral arm 22 having on its free end a forwardly projecting lug 24.

Indenting the side 23 of the extension 20 intermediate the ends thereof is a notch 26 having a rearwardly facing right angular shoulder 27, and a relatively long concave recess 28, located forwardly of the notch 26.

Slidably and nonrotatably mounted for longitudinal movement on the extension 20 is a flat hollow pin guard 30. Along one side edge the guard 30 has a longitudinal pin point socket 32 having an axial bore 34 opening at its rear end for receiving the point 18 of the first leg 12 of the pin member 10. Between its side edges the guard 30 has an internal longitudinal wall 36 extending between the side walls 37 of the guard and composed of a forward portion 35 laterally spaced from the adjacent side edge wall 39 of the guard sufficiently to accommodate the arm 22, a transverse portion 41 at the rear end of the portion 35 serving as a stop for the arm 22, and a rear portion 43 extending rearwardly from the transverse portion 41. The wall portion 43 is spaced from the side edge wall 39 of the guard to define a rectangular slideway 45 in which the extension 20 operates. A forward transverse wall 47 extends across the interior of the guard 30 between the side edge walls at the forward ends of the wall 36 and the socket 32. The portion of the transverse wall 47 facing the slideway 45 has therein a spring seat socket 38, receiving the forward end of a coil spring 40 whose other end bears against the arm 22. The spring 40 serves to yieldably urge the guard forwardly relative to the extension 20 and the second pin member leg 14 and forwardly relative to the first pin member leg 12 and its point 18.

A resilient locking dog 42 is preferably in the form of an elongated spring strip fixed at its forward end, as indicated at 42', to the inward side of the guard side edge wall 39 near the transverse wall 47. In the rearward end portion of the dog 42 is a convex portion 44 arranged to conformably engage in the concave recess 28 of the extension 20, and the dog 42 terminates at its rear end in a lateral tongue 46 which is arranged to lockingly engage behind in the notch 26 of the extension 20 and against the shoulder 27 thereof, to lock the guard 30 in guarding position, with the point 18 in the socket 32, as shown in Figure 2.

For cooperation with the locking dog 42 there is slidably mounted on the guard side edge wall 39 a releasable locking slide 48. Intermediate its ends the slide 48 has a longitudinal slot 49 receiving a headed pin 51 fixed in the side edge wall 39. On its rear end the slide 48 has a lateral finger-piece 50 located rearwardly of the guard. The slide 48 operates between the side edge wall 39 and the locking dog 42 and has a thickened portion 52 along its forward end which has a wedge-shaped forward end 53, serving as a cam, and rearwardly of the cam a notch 55 shaped to conformably receive the adjacent side of the tongue 46, as shown in Figure 2, whereby the locking dog 42 is positively held in locking engagement with the recess 28 and the notch 26 of the extension 20.

The dog 42 is released by drawing the slide 48 rearwardly by means of the finger-piece 50, so that the guard 30 can be moved forwardly along the extension 20 to the released position shown in Figure 1, wherein the pin point 18 of the first pin member leg 12 is free of the socket 32 and the leg 12 can be flexed, as shown in dotted lines in Figure 1, to engage in cloth or the like to be pinned. In the preferred form of the invention, the rear end of the pin guard 30 is provided with a recess 54 to receive the finger piece 50 of the slide 48.

Obviously, if so desired, the spring loop 16 may take the form of the spring loop 16' in Figure 6 or 16" in Figure 7.

When it is desired to lock the pin 10, the point 18 is engaged in the socket 32 and the guard moved rearwardly against the resistance of the spring 40. When the locking tongue 46 is engaged in the notch 26 and the convex portion 44 in the recess 28, the slide 48 is moved forwardly to advance the wedge 53 against and depress the tongue 46 and pass therebeyond and engage the slide notch 55 with the tongue 46 and the wedge 53 in the concavity 44 of the dog 42, as illustrated in Figure 2.

Obviously, if so desired, any ornamental design letter or like insignia may be applied to the pin guard, as suggested in Figure 5. It is also apparent that the pin guard may be produced of any suitable material such as plastic, stainless steel and the like.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

In a safety pin, a pin member having laterally spaced first and second legs having forward and rear ends, a spring loop resiliently connecting and spacing the rear ends of the legs, a point on the forward end of the first leg, a longitudinal extension on the forward end of the second leg, said extension having a forward end terminating in a lateral arm, a hollow guard having spaced side walls, and first and second side edges, a pin point socket on and extending along said first side edge for receiving the point on said first pin member leg in a guarding position of the guard, a tubular slideway on and extending along said second side edge of the head, said extension being slidably and non-rotatably engaged through said slideway, a transverse wall in said guard spaced forwardly from said slideway and having a spring seat facing said slideway, a compressed coil spring seated at one end in said seat and engaged at its other end with said lateral arm of said extension whereby the guard is yieldably urged forwardly relative to the extension and the pin member legs and away from its guarding position, a spring dog secured along said second side edge of the guard having a rear end terminating in a lateral locking tongue, said extension having an outer side provided with a notch in which said tongue is arranged to engage only in the rearwardly retracted guarding position of the guard, and a locking slide slidably mounted on the said side edge of the guard for endwise movement along the outer side of the extension, said locking slide terminating at its forward end in a cam for engaging and depressing said tongue into the notch in the outer side of the extension and having an intermediate portion arranged to bear against the spring dog and hold the tongue in said notch when the extension is moved forwardly from a rearwardly retracted position with the guard in its guarding position.

References Cited in the file of this patent

UNITED STATES PATENTS

| | | |
|---|---|---|
| 83,824 | Bogert | Nov. 10, 1868 |
| 784,827 | Zimmermann | Mar. 14, 1905 |
| 896,084 | Calvert | Aug. 18, 1908 |
| 1,360,794 | Ralph | Nov. 30, 1920 |
| 2,246,495 | Alessi | June 24, 1941 |

FOREIGN PATENTS

| | | |
|---|---|---|
| 8,956 | Great Britain | of 1888 |